United States Patent
Ganguly et al.

(10) Patent No.: US 10,102,017 B2
(45) Date of Patent: *Oct. 16, 2018

(54) TIMER ACCESS FROM USER MODE THROUGH A SHARED MEMORY PAGE

(71) Applicant: Microsoft Technology Licensing, LLC, Redmond, WA (US)

(72) Inventors: Shuvabrata Ganguly, Seattle, WA (US); Jason S. Wohlgemuth, Duvall, WA (US); Allen Marshall, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 638 days.

This patent is subject to a terminal disclaimer.

(21) Appl. No.: 13/770,941

(22) Filed: Feb. 19, 2013

(65) Prior Publication Data

US 2013/0160012 A1 Jun. 20, 2013

Related U.S. Application Data

(63) Continuation of application No. 12/414,374, filed on Mar. 30, 2009, now Pat. No. 8,392,917.

(51) Int. Cl.
*G06F 9/40* (2006.01)
*G06F 9/455* (2018.01)

(52) U.S. Cl.
CPC ...... *G06F 9/45533* (2013.01); *G06F 9/45558* (2013.01); *G06F 2009/45583* (2013.01)

(58) Field of Classification Search
CPC ............. G06F 9/45533; G06F 9/45558; G06F 2009/45583
See application file for complete search history.

(56) References Cited

U.S. PATENT DOCUMENTS 7,475,002 B1 * 1/2009 Mann .............................. 703/23

* cited by examiner

*Primary Examiner* — Corey S Faherty

(57) ABSTRACT

A computing system in which a software component executing on a platform can reliably and efficiently obtain state information about a component supported by the platform through the use of a shared memory page. State information may be supplied by the platform, but any state translation information needed to map the state information as supplied to a format as used may be provided through the shared page. In a virtualized environment, the state translation information can be used to map the value of a virtual timer counter or other component from a value provided by a virtual processor to a normalized reference time that will yield the same result, regardless of whether the software component is migrated to or from another virtual processor. Use of a shared page avoids the inefficiency of an intercept into a virtualized environment or a system calls in native mode operation.

21 Claims, 6 Drawing Sheets

TIMER ACCESS FROM USER MODE THROUGH A SHARED MEMORY PAGE

RELATED APPLICATION

This application is a Continuation of prior application Ser. No. 12/414,374 filed Mar. 30, 2009, which is incorporated herein by reference.

BACKGROUND

Virtual computing environments provide flexibility to computer users and administrators in distributing and allocating computing resources. For example, the Microsoft® Hyper-V virtualization product in variants of the WINDOWS® Server 2008 operating systems supports creating and executing one or more partitions, or virtual machines, on a single computer. A guest operating system, such as variants of the WINDOWS® operating systems developed by the Microsoft Corporation, may be installed on each partition and application programs may execute on the operating system. Software, whether the guest operating system or applications, that was developed to be executed on physical hardware may be executed without modification on a partition, because the hypervisor environment provides interfaces similar to those provided by hardware devices to software components executing on the hardware. Though because they are virtual, partitions may easily be created with different capabilities to serve different purposes, including with differing amounts of virtual memory, with different number or types of virtual processors, and with different types of virtual hardware devices.

Virtualization allows hardware resources to be shared among the software executing in different partitions, with the allocation of those hardware resources flexibly set as the partitions are established. Moreover, because a virtualization environment may present a consistent virtual interface to an operating system regardless of the underlying hardware on which it is executing, virtualization also allows for easy migration of software components from one machine, whether virtual or physical, to another, as needs or computing resources change.

Some of the hardware devices that may be virtualized by a virtualization platform include timer devices. Operating systems or user-level applications may have a need for a high-resolution timer, or a reference timer. In some computing environments, support for a reference timer may be provided by a hardware device in the computer. Various types of hardware devices may be used to support a hardware timer. For example, timer support may be provided by an Advanced Configuration and Power Interface (ACPI) Power Management (PM) timer, as is known in the art.

As another example, timer support may be provided by an invariant Time Stamp Counter (TSC) that is included in modern microprocessors. Unlike a variant TSC, which may exhibit a change in timer resolution or frequency, caused, for example, by changes or interruptions to the core frequency of the processor due to processor power management features, an invariant TSC has a frequency that stays fixed for a given processor. An invariant TSC may therefore serve as a good source for support for a reference timer.

In a virtualized environment, attempts to access a hardware component not emulated as part of a virtual processor are intercepted by the virtualization platform. These intercepts avoid changes to hardware devices that could disrupt operations of software in other partitions that use the same hardware devices or even the virtualization platform itself. In a conventional virtualization platform, such an intercept may occur if a guest operating system executing in a partition attempts to access an ACPI timer. Though, in some virtualized environments, a virtual processor may emulate an invariant time stamp counter so that a guest operating system can access a virtual time stamp counter without an intercept to the virtualization platform.

SUMMARY

Although a user-mode application executing on an operating system on a platform may be able to obtain state information from a hardware component on the platform, the user-mode application may also need translation information in order to map the state information as obtained into a suitable format. The translation information may be provided by an interface to the user-mode application.

The interface to the user-mode application could be a shared memory page. When the operating system is executing natively on the hardware, a shared page between the kernel of the operating system and the user-mode application may provide the translation information, and may allow the user-mode application to avoid a system call to the kernel. If the user-mode application is in a virtualized environment, in which the operating system is executing in a guest partition on a hypervisor, a memory page containing the translation information may be shared between the user-mode application and the hypervisor, or it may be shared between the user-mode application and the kernel of the operating system, as well as the hypervisor. Thus, in a virtualized environment, the use of an interface such as a shared page to provide translation information may avoid both a system call to the kernel and an intercept into the hypervisor, and therefore avoids a decrease in overall system performance that could otherwise occur as the result of such a system call or intercept.

If the user-mode application is executing on an operating system in a guest partition, the guest partition may be migrated to another computer, which could result in the state of the hardware component accessed by the user-mode application to change in unexpected ways. For example, if a user-mode application accesses an invariant time stamp counter through a virtual processor in a guest partition on a first computer, the time stamp counter accessed from a virtual processor in the guest partition when the guest partition is migrated to a second computer may provide a different resolution, thus requiring a translation to occur in order to not disrupt operations that rely on the frequency of the invariant time stamp counter not changing. Accordingly, the translation information obtained through the interface, such as a shared page, may allow the user-mode component to translate the value of the time stamp counter obtained from the migrated guest partition into an expected value.

In addition, when operating in a virtualized environment, the capabilities of hardware components in a guest partition may change when the guest partition is migrated to a different computer. For example, an invariant time stamp counter may not be available in virtual processors on one computer, while it may be available in virtual processors on another computer, even if the virtual processors are used by the same guest partition. Accordingly, a fallback mechanism may need to be provided to user-mode applications that rely on particular capabilities of hardware components in a guest partition, such as the presence of an invariant time stamp counter. Therefore, an indication the capability of a hardware component, such as an indication of whether or not an invariant time stamp counter is available in a guest partition, may be provided to a user-mode application through the interface. This allows the user-mode application to operate in a fallback mode, such as, in the case of no invariant time stamp counter being present, accessing another timer, such as an ACPI timer, through a system call interface.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that, in a virtualized environment, use of a virtual time stamp counter provides performance advantages relative to tracking time by accessing other hardware based timers, such as an ACPI timer. However, migration of partitions, which is also desirable in some virtualized environments, can disrupt the sequential nature of time reference values provided by relying on virtual time stamp counters, yet accessing the underlying hardware to obtain information necessary to keep a consistent reference time is also undesirable because of the inefficiencies associated with an intercept into the virtualization platform.

Accordingly, in some embodiments, a guest operating system and/or application level components that execute in a partition of a virtualized environment may determine whether the virtualization platform can supply information used to create a consistent reference time. In this way, these components are "enlightened" as to a function of the virtualization platform to support consistent operation even as partitions are migrated from one virtual processor to another.

The virtualization platform may reveal that it supports such a capability in any suitable way. For example, it may operate a virtual processor that returns information in response to execution of a specific instruction. The information may reveal the nature of support provided by the platform. The virtualization platform also may provide data used by the guest operating system and/or applications running on the guest operating system to determine when a migration has occurred in any suitable way. Similarly, data to compute a state translation from a value of a virtual component after a migration to a frame of reference that is common with the frame of reference used prior to the migration may be made available in any suitable way. For example, data may be made available through a shared memory page, both to indicate that a migration has occurred and to allow the state translation to be made.

In the case of a timer, the state translation data may include a scale factor and an offset. As a specific example, this data may be used as part of a state translation computation in which a value of the virtualized timer is translated to a normalized reference time regardless of the virtual processor on which the partition executes. Though, if state translation data is provided about other virtualized hardware components, other types of state translation data may be provided.

Figure 1:
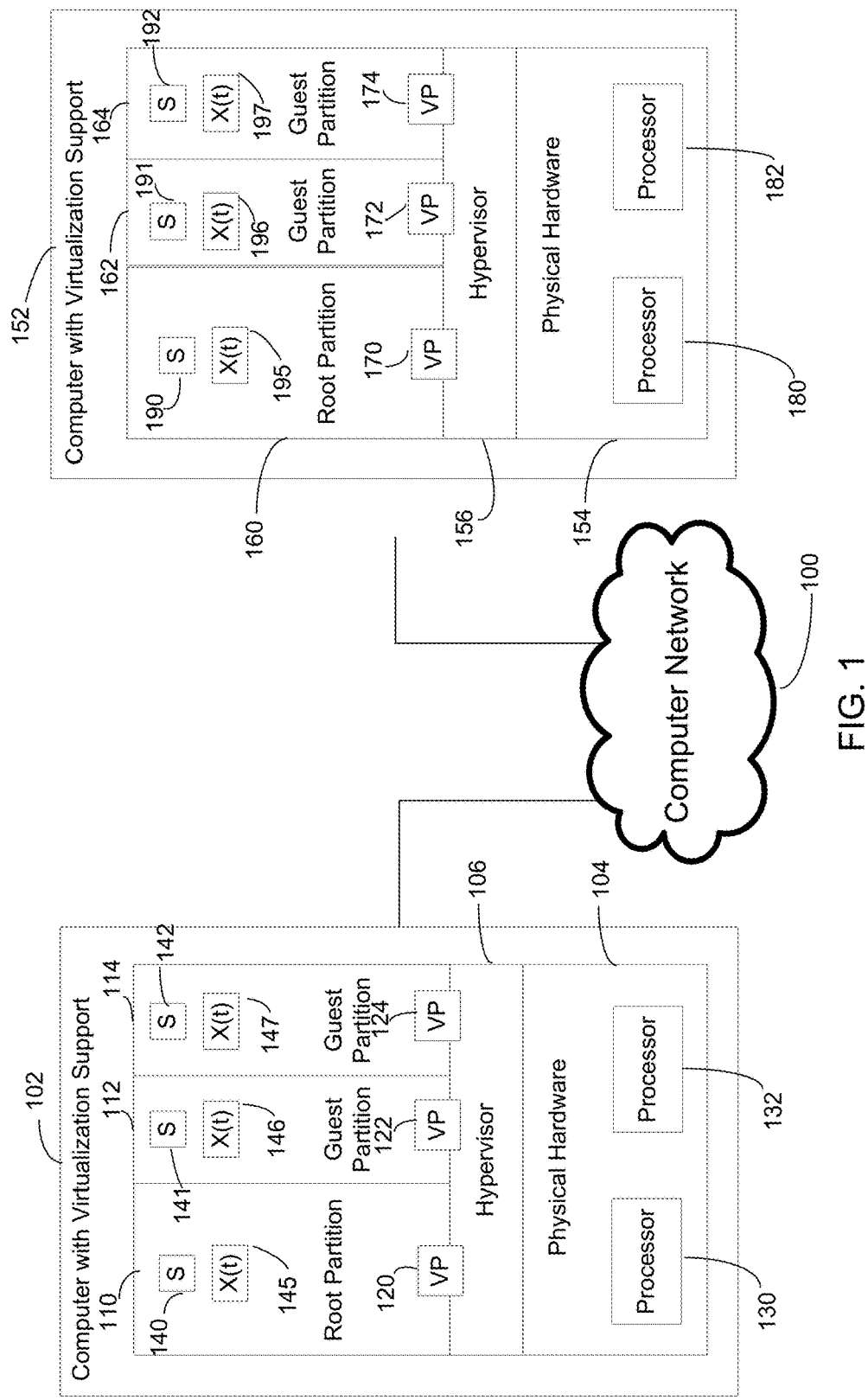
FIG. 1 is a diagram of a computing environment in which the invention may be practiced.

Accordingly, embodiments of the invention may be practiced in many environments. FIG. 1 is a diagram of an exemplary computing environment in which the invention may be practiced. FIG. 1 includes a computer network 100. Computer network 100 may be any suitable computer communications network, including the Internet, a local area network (LAN), such as at a corporate site, or a wide area network (WAN). The computer environments illustrated in FIG. 1 may include computer 102 and computer 152, which may be connected to the computer network 100 over any suitable communications medium, including wireless or wired communications.

Computers 102 and 152 may include physical hardware 104 and 154, respectively. Physical hardware 104 and 154 may be any suitable computer hardware according to any suitable computer architectures, such as Symmetric Multi-processing (SMP) or Non-Uniform Memory Access (NUMA) architectures, and may include any suitable microprocessors according to any suitable instruction set, such as Reduced Instruction Set Computing (RISC) or Complex Instruction Set Computer (CISC) instruction sets, or any suitable combination thereof. The computers 102 and 152 may be in any suitable form factor, including a laptop computer, desktop computer, tower computer, mainframe, rack-mount server, and blade server. The computers 102 and 152 may have the same type of physical hardware 104 and 154 in the same form factors, or they may be different, as the invention is not limited in this respect.

Computers 102 and 152 may also each include a hypervisor 106 and 156, respectively. The hypervisors 106 and 156 may each comprise a component in a virtualization platform on the computer in which they are executing, such as computers 102 and 152, respectively. The hypervisors 106 and 156 may be, for example the Microsoft® Hyper-V™ Server 2008 or the Hyper-V™ hypervisor included in versions of the WINDOWS® Server 2008 operating system developed by the Microsoft® Corporation. The hypervisors 106 and 156 may be the same version and type of hypervisor, or they may be different versions and/or different types of hypervisor, as the invention is not limited in this respect. The hypervisors 106 and 156 may be implemented as computer-executable instructions developed in any suitable programming language that are stored on a computer-readable medium accessible to the computers 102 and 152, and executed on at least one microprocessor included in the physical hardware 104 and 154.

The hypervisors 106 and 156 may each include functionality to create one or more virtual machines, or partitions, that execute on top of the hypervisor. In the example of FIG. 1, the computers 102 and 152 may each include a root partition, such as root partitions 110 and 160, respectively that execute on top of the hypervisors 106 and 156, respectively. The computers 102 and 152 may also each include one or more guest partitions, such as guest partitions 112 and 114 that execute on top of the hypervisor 106, and guest partitions 162 and 164 that execute on top of the hypervisor 156. Together with the hypervisor, a root partition may also form part of a virtualization platform on the computer in which it executes, and may have greater access than a guest partition to physical hardware components, such as components in physical hardware 104 or 154. While the computers 102 and 152 are each illustrated as including two guest partitions, they may each include a different number of guest partitions, including no guest partitions, as the invention is not limited in this respect.

Each partition, in conjunction with the hypervisor on which it executes, may emulate a computer by emulating hardware components that would be included in a typical computer. In some computing systems, the hardware components are emulated by the hypervisor acting in conjunction with the root partition. For example, access to some physical hardware devices by a guest partition passes through the hypervisor to the root partition, which may perform the access to the actual physical devices. However, in other computing systems in which the invention is practiced, the functionality ascribed to either the hypervisor or the root partition may be distributed differently, as the invention is not limited in this respect. For example, some computing systems on which the invention may be practiced may not include a root partition, as all the functionality ascribed to the root partition may be ascribed in these systems to the hypervisor.

Software, such as an operating system, may be loaded on a guest partition. The guest partition may be implemented by the hypervisor in such a way that computer executable instructions implementing a software component such as an operating system may be the same instructions used to implement an operating system on a physical processor and other physical hardware.

In the example of FIG. 1, each partition is associated with an emulated processor, or virtual processor. For example, partitions 110, 112 and 114 are associated with virtual processors 120, 122 and 124, respectively, and partitions 160, 162 and 164 are associated with virtual processors 170, 172 and 174. While each partition is illustrated as being associated with one virtual processor, a partition may be associated with any suitable number of virtual processors, and some partitions may be associated with different numbers of virtual processors than other partitions, as the invention is not limited in this respect. The virtual processors may be implemented in any suitable way by the hypervisors 106 and 156, including any suitable combination of hardware and software.

In some environments in which the invention is practiced, emulated hardware may have different characteristics in different partitions. For example, an emulated hardware timer in a guest partition may have different characteristics, such as a different frequency, than an emulated hardware timer in another guest partition. As another example, each virtual processor in a guest partition may inherit characteristics, such as a clock frequency, from a physical processor that is part of the physical hardware of the computer in which the partition is instantiated. For example, virtual processors 120, 122 and 124 may inherit many characteristics from physical processors 130 and 132, and virtual processors 170, 172 and 174 may inherit many characteristics from physical processors 180 and 182. Physical processors 130, 132, 180 and 182 may be any suitable type of processor or processor core. For example, processors 130 and 132 may either each be a separate single processor, or they may be a pair of logical processors, or processor cores, in a single processor.

A partition, such as guest partition 112, may access the emulated hardware components, such as virtual processor 122, in any suitable way. Some emulated hardware components may be accessed by a partition in a different way from other emulated hardware components. For example, accessing some emulated hardware components from a guest partition may cause an intercept into the hypervisor, such as hypervisor 106, while a guest partition may access other emulated hardware components without the need to intercept into the hypervisor. In some environments in which the invention is practiced, an operation that causes an intercept into the hypervisor may take up to an order of magnitude longer than the equivalent operation that does not require an intercept into the hypervisor.

As is known in the art, an intercept may occur when software, such as an operating system, executing in a guest partition executes an instruction that would, in a non-virtualized environment, access physical hardware devices. A hypervisor or a root partition can intercept the access to a hardware device from a guest partition, resulting in control being transferred to the root partition or hypervisor. The root partition or hypervisor may then alter the effect of the intercepted instruction such that, to the software executing on the guest partition, the instruction mirrors the expected behavior in physical hardware. An intercept may affect only the state of a single virtual processor, but allow other virtual processors within the same partition to continue to run.

Some hypervisors may support saving and restoring the state of a guest partition. Saving and restoring a partition may be likened to pausing and resuming the operation of the partition. This may be implemented in any suitable way, including saving the contents of any emulated hardware state in the partition, such as registers or memory in the partition, to any suitable computer storage medium, such as a file in a file system. Besides the contents of emulated hardware state in the partition, saving a partition may also involve saving any other suitable information that may be needed by a hypervisor in order to successfully restore a partition to the same state. When a saved partition is restored, the state of the emulated hardware in the partition may be the same as when the partition was saved. For example, in FIG. 1, partitions 110, 112 and 114 include saved state 140, 141 and 142, and partitions 160, 162 and 164 include saved state 190, 191 and 192.

A partition may be also migrated to a different physical computer, and be made to execute on the hypervisor on the different physical computer. For example, in the computing environment of FIG. 1, guest partition 124 executing on the hypervisor 106 in computer 102 may be migrated to computer 152, and be made to execute on the hypervisor 156 rather than on the hypervisor 106. Migrating a guest partition may be done in any suitable way, as the invention is not limited in this respect. In some environments in which the invention is practiced, migrating a guest partition is a special case of saving and restoring a guest partition, in which the partition is restored on a different physical machine and hypervisor than the machine on which it was saved. However, in other environments in which the invention is practiced, migration need not involve saving or restoring a partition, but may be performed "live," without the need to "pause" the partition or cause any disruption of service. The migrated partition may be transferred in any suitable way, including over a computer network, such as the computer network 100, or by being saved to a suitable computer storage medium, such as a tape, or disk drive, and being physically moved to the other computer.

In some environments in which the invention is practiced, successfully migrating a partition may require the migration to be seamless to any software executing in the partition. However, some characteristics of the emulated hardware may differ when a partition is migrated from one computer to another. For example, some emulated hardware, such as a virtual processor, may inherit characteristics, such as a clock speed, from hardware components in the physical hardware, such as a physical processor, on the machine in which the partition is executing. Some of the characteristics of the emulated hardware, such as the clock speed of a virtual processor, may change when the partition is migrated from one machine to another. This may cause problems with any software that may be executing in the guest partition and would not have expected any change in the emulated hardware to occur.

In the example of FIG. 1, the partitions each include computer-executable instructions that perform an operation based on the state of a hardware component that may change when the partition is migrated from one machine to another. Partitions 110, 112 and 114 include operations 145, 146 and 147, respectively, and partitions 160, 162 and 164 include operations 195, 196 and 197, respectively.

Accordingly, a translation may need to be applied to the state of some of the emulated hardware components in order for the migration of a guest partition to a different physical machine to be seamless to any software executing on the guest partition. The hypervisor may be able to perform any needed translation for the state of emulated hardware components that are accessed by causing an intercept into the hypervisor. However, in the case of the state of emulated hardware components that can be accessed by software executing on the guest partition without causing an intercept into the hypervisor, it may be advantageous to perform some translation within the software in the guest partition in order to avoid an intercept into the hypervisor, and by avoiding an intercept, improved performance may be provided.

In some embodiments of the invention, in order to support the improved performance that may result from accessing an emulated hardware component from a guest partition without causing an intercept into a hypervisor, software in the guest partition may be specially configured to perform the translation of particular emulated hardware that may be required to migrate the emulated hardware from one physical computer to another. In some of these embodiments, the specially configured software executing in the guest partition may perform the translation based, at least in part, on translation information obtained from the hypervisor through an interface other than the mechanism a guest partition would use to access hardware. The hypervisor may have computed the translation information based on any suitable considerations, including knowledge of particular characteristics of physical hardware that may have changed when the partition was migrated from one physical computer to another.

Figure 2:
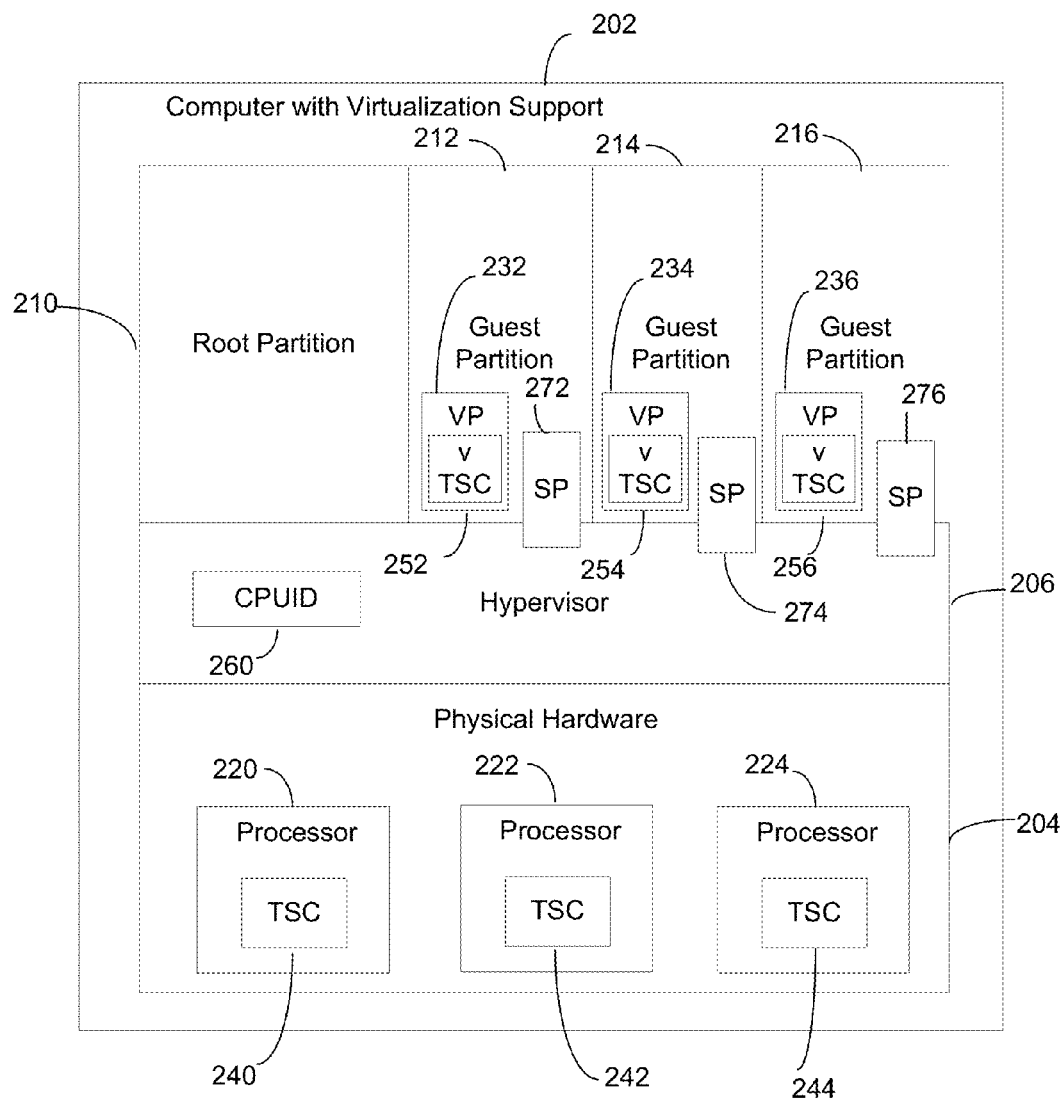
FIG. 2 is a block diagram of a computing system that supports migrating a guest partition that can access a hardware component without causing any intercept into the hypervisor according to some embodiments of the invention.

FIG. 2 is a block diagram of one embodiment of the invention that supports migrating a guest partition that can access a hardware component without causing any intercept into the hypervisor. FIG. 2 illustrates a computer 202 that includes a hypervisor 206 that executes on top of physical hardware 204, which may be any suitable computer, hypervisor, and hardware, as discussed in conjunction with FIG. 1. The physical hardware 204 includes one or more microprocessors, illustrated as physical processors 220, 222 and 224, which may be any suitable microprocessor, as discussed in conjunction with FIG. 1.

The example of FIG. 2 also includes a number of partitions that execute on top of the hypervisor 206, illustrated as root partition 210 and guest partitions 212, 214 and 216. Each guest partition may include one or more virtual processors. In the example of FIG. 2, guest partition 212 includes virtual processor 232, guest partition 214 includes virtual processor 234, and guest partition 216 includes virtual processor 236. While each guest partition is illustrated as including one virtual processor, each partition may include any number of virtual processors, as the invention is not limited in this respect. Each of the virtual processors may inherit certain characteristics, such as a clock speed, from one of the physical processors.

In the example illustrated by FIG. 2, software executing in each guest partition may include machine-executable instructions for calculating a reference time that may be used as a high-resolution timer by software components executing in the guest partition. Some embodiments of the invention may include support for implementing the high-resolution timer in multiple ways, some of which may cause an intercept into the hypervisor, and others of which may not. For example, some embodiments of the invention may include support for implementing the reference timer in a guest partition using the Advanced Configuration and Power Interface (ACPI) Power Management (PM) timer, which may be accessed by a guest partition by causing an intercept into the hypervisor. However, the same embodiments of the invention may also include support for implementing the high-resolution timer by accessing a virtual constant-rate or invariant time stamp counter (TSC) read from a virtual processor, which may not cause an intercept into a hypervisor. As is known in the art, the frequency of an invariant TSC remains fixed for a given processor, regardless of changes or interruptions to the core frequency of the processor due to processor power management features, such as processor performance states, processor idle sleep states, etc.

In some embodiments of a computer system supporting multiple ways of implementing a reference timer, a first method of implementing the reference timer may be preferred in some scenarios, such as one that does not cause an intercept into a hypervisor, while a second method may be used as a backup if the first method cannot be used. For example, implementing the reference timer based on a virtual invariant TSC read from a virtual processor may not be possible if an underlying physical processor on the computer in which the guest partition is executing does not also include an invariant TSC, because the virtual processor in the guest partition may inherit this characteristic from the physical processor. If the physical processor does not include an invariant TSC, then the guest partition may implement the reference timer using a different method, such as by accessing an ACPI PM timer emulated by the hypervisor, thereby causing an intercept into the hypervisor.

In the example illustrated in FIG. 2, each of physical processors 220, 222 and 224 includes an invariant TSC 240, 242 and 244, respectively. Accordingly, the virtual processor(s) associated with each guest partition, virtual processors 232, 234 and 236 each include a virtual TSC 252, 254 and 256, respectively.

Software in a guest partition may make a determination of what type of method to use to calculate the reference timer based on any suitable criteria. In the embodiment illustrated by FIG. 2, a partition may access the state of a hardware component that is emulated by the hypervisor to determine if invariant TSCs are supported by the virtual processors. For example, software executing in a partition, such as guest partition 212, may issue an instruction with a CPUID opcode to an associated virtual processor, such as virtual processor 232, which results in a return of information from the virtual processor 232. As is known in the art, the CPUID opcode may be used by software to determine a processor type, and whether particular features may be supported by the processor. While it may appear to the software executing in the partition that the CPUID opcode is executed by a physical processor, in the embodiment illustrated by FIG. 2, a CPUID implementation 260 of the CPUID opcode for all virtual processors may be provided by the hypervisor. In one embodiment of the invention, bit 13 of the EBX register for CPUID leaf 0x40000003 is set to one if the virtual TSC is available to be accessed by a guest partition.

The use of the CPUID instruction to indicate whether or not a guest partition may have access to invariant virtual TSCs on the particular computer on which the partition is executing may thus be a form of enlightenment to a guest partition that may be particularly useful if the guest partition is ever migrated to a different computer. Because not all computers include suitable physical processors to support the implementation of a reference timer in a guest partition using virtual TSCs, it is possible for a guest partition to be migrated to a computer with a different level of support for accessing virtual TSCs than the prior computer in which it was executing. Using the example illustrated in FIG. 1, the physical processors 130 and 132 in computer 102 may include support for invariant TSCs, and thus may support the implementation of a reference timer using an invariant TSC in the guest partition 114. However, the processors 180 and 182 in computer 152 may not allow support for invariant TSC access from guest partitions executing in computer 152. Accordingly, if guest partition 114 is migrated from computer 102 to computer 152, the method of implementing the reference time in guest partition 114 may need to change from using the invariant TSC in computer 102 to using another method, such as the ACPI PM timer, in computer 152. If guest partition 114 is then migrated back to computer 102, the reference time in guest partition 114 may then be implemented once again using the invariant TSC. In either case, the determination may be made by software executing in the guest partition 114 analyzing the result of issuing an instruction to virtual processor 124 with a CPUID opcode, as discussed above.

Even if a guest partition migrates between computers that both provide virtual TSC support to the guest partition, certain characteristics, such as a current count or a timer resolution, of the virtual TSC may vary from one computer to another, which may cause problems with the software executing in the guest partition. For example, in some environments in which the invention is practiced, the frequency of an invariant TSC may be based on the core clock frequency of the physical processor. In addition, the core clock frequency and the frequency of the virtual TSC of a virtual processor may be based on the core clock frequency and the TSC frequency of the physical processor, respectively. Thus, even if a guest partition, such as guest partition 114, is migrated from a computer that supports accessing a virtual TSC from the guest partition, to another computer that also supports virtual TSC access from the guest partition, the frequency of the virtual TSC may change when the partition is migrated if the core clock frequency of the physical processors differ from one computer to the other. However, software executing in the guest partition may expect the frequency of the virtual TSC to not change, even if the partition is migrated to another computer.

The inventors have appreciated that it may be useful to perform a translation of the virtual TSC to account for a change in characteristics of the TSC, such as a change in frequency that may occur when a partition is migrated. Because a virtual TSC may be read directly by the software executing in a guest partition without causing an intercept into the hypervisor, it would be advantageous to include support from within a guest partition for translating the time-stamp counter from one frequency to another frequency. Thus, software in the guest partition may be specially configured to perform the required translation.

However, the software configured to perform the translation in the guest partition may not have sufficient knowledge on its own in order to successfully perform the translation. In some embodiments, the required information may only be available to the hypervisor. For example, the hypervisor on a machine to which the guest partition has migrated may have knowledge of the TSC frequency on the prior machine. The hypervisor may provide this translation information to the guest partition through any suitable interface.

In the embodiment illustrated in FIG. 2, the hypervisor provides translation information to each guest partition in the form of a shared page. In some embodiments of the invention, accessing the shared page may be performed by a guest partition without causing any intercept into the hypervisor. In the example of FIG. 2, shared pages 272, 274 and 276 are shared between the hypervisor and the guest partitions 212, 214 and 216, respectively. As is known in the art, a shared page is a region of memory that is accessible for reading and/or writing by more than one component. While a separate page is illustrated as shared between the hypervisor and each guest partition, in some embodiments a single page may be shared between the hypervisor and all guest partitions, as the invention is not limited in this respect. Alternatively, in some embodiments, the hypervisor may share more than one page with each guest partition.

The shared pages may be implemented in any suitable way, including techniques as known in the art. In some embodiments, this may be done by defining an overlay page called a "Reference TSC Page." A software component, such as an operating system, executing in the guest partition may map the Reference TSC Page as an overlay page using the reference TSC page Model Specific Register (MSR), which may be 0x40000021. Thus, based on information available to it, such as the prior TSC frequency, the hypervisor may populate the shared page with translation information, which may be read by software in the guest partition to perform the necessary translation on the virtual TSC.

Figure 3:
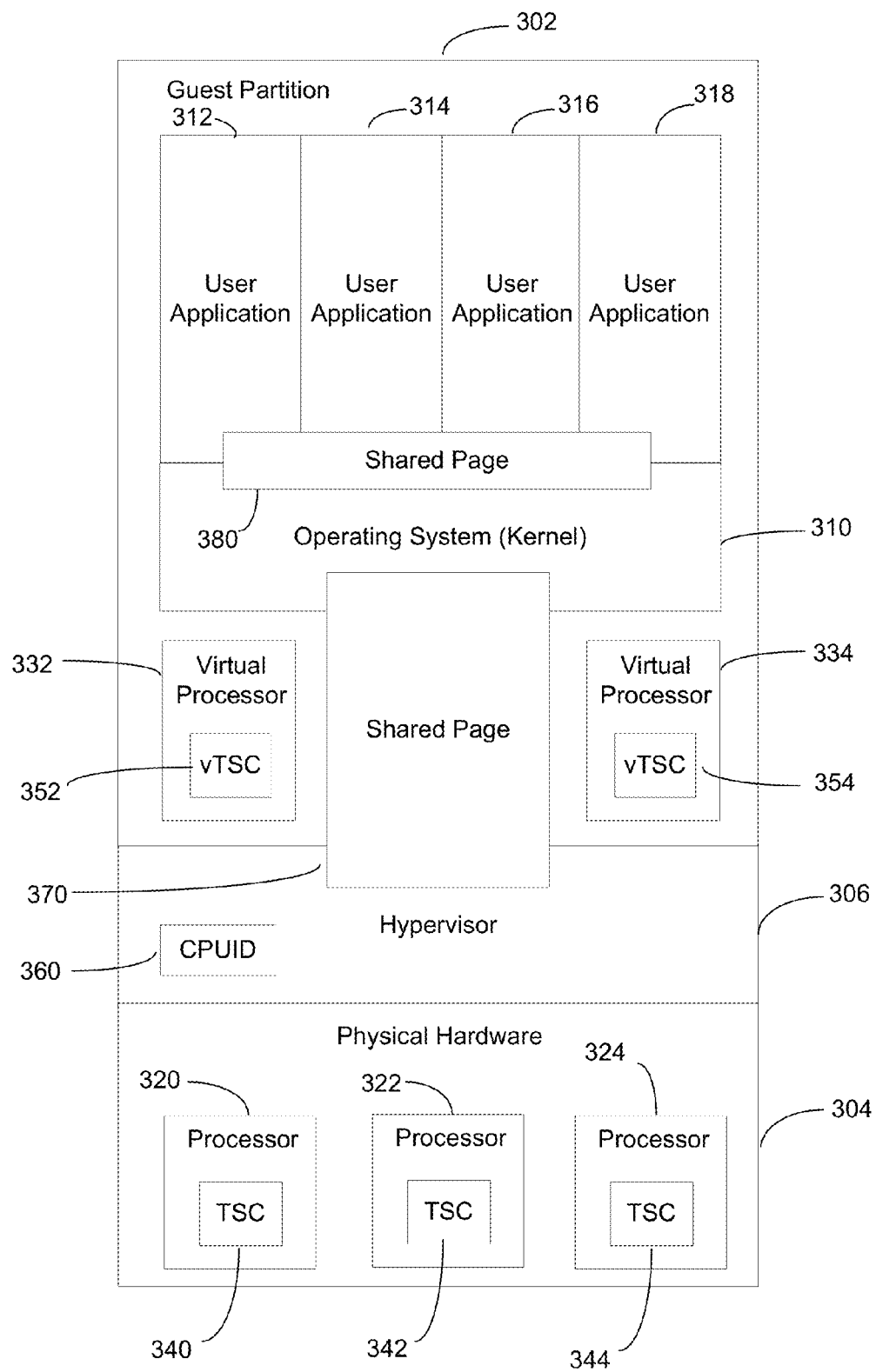
FIG. 3 is a block diagram of a computing system in which the invention is applied to support the implementation of a high-resolution reference time from within a user-level process executing in a guest partition.

Besides being accessed by an operating system in a guest partition, hardware state information, such as a virtual TSC, may also be accessed to user-mode components executing in a guest partition. FIG. 3 illustrates a block diagram of an embodiment of the invention in which the invention is applied to support the implementation of a high-resolution reference time from within a user-level process executing in a guest partition, based on an invariant TSC. FIG. 3 illustrates a guest partition 302 that executes on top of a hypervisor 306 that executes on top of physical hardware 304, which may be within a computer such as computer 202 in FIG. 2, for example. Physical hardware 304 includes one or more physical processors, such as physical processor 320, 322 and 324, which may be any suitable processors, such as was discussed above in conjunction with FIG. 1. Each of physical processors 320, 322 and 324 may include a TSC, such as TSC 340, 342 and 344, respectively. The guest partition 302 includes one or more virtual processors, such as virtual processors 332 and 334, including virtual TSCs 352 and 354, respectively.

The guest partition includes computer-executable instructions implementing an operating system 310. Operating system 310 may be any suitable operating system, such as variants of the WINDOWS® operating systems developed by Microsoft® Corporation. The operating system 310 may include software components that operate in a kernel mode. The guest partition 302 may also include computer-executable instructions implementing user applications 312, 314, 316 and 318 that execute on top of the operating system 310, which may be any suitable user applications, as the invention is not limited in this respect.

The operating system 310 may implement a reference time using one of the virtual TSCs 352 or 354. It may do so in any suitable way. As discussed in the embodiment of FIG. 2, it may issue a CPUID instruction to one of the virtual processors, such as virtual processor 332 to determine whether support is available for calculating the reference time based on a virtual TSC. The CPUID support for the virtual processors may be implemented by CPUID implementation 360 in the hypervisor 306. When it determines that support is available, the operating system 310 may access a virtual TSC, such as virtual TSC 352. The operating system 310 may then perform a translation on the information obtained from the virtual TSC 352. In order to perform the translation, the operating system 310 may first obtain translation information from the hypervisor 306 in any suitable way, such as by reading the contents of shared page 370, which is shared between the hypervisor 306 and the guest partition 302. The operating system 310 may have then calculated a suitable reference time that may be used by other components in the operating system.

The discussion above has only described reading the TSC from hypervisor-level or kernel-level instructions. However, in some environments, the TSC may be accessed at any privilege level, including from user-level processes. Thus, the TSC may be accessed from user-level code without the need for a system call to the kernel, and if in a virtualized environment, without the need to cause an intercept to the hypervisor.

As a consequence, in the example illustrated by FIG. 3, user applications 312, 314, 316 and 318 may in some computing environments have the privilege to access a TSC directly, without needing to issue a system call to the kernel of the operating system 310, and without needing to cause an intercept into the hypervisor 306. While a direct access of the TSC from a user application, such as user application 312, may yield favorable performance, it is a raw, non-translated value, and may be unsuitable in a virtualized environment if the guest partition in which the user application is executing has been migrated.

Thus, the inventors have appreciated that a user-level process implementing a high-resolution timer by directly accessing the TSC may benefit from performing a similar translation as that performed by the operating system 310 when the user-level process executes in a virtualized environment. However, the shared page 370, shared between the hypervisor 306 and the operating system 310 may not be accessible to user applications, such as user application 312, or it may not be in a suitable format. Another interface may be required that is accessible to the user application 312.

Accordingly, in some embodiments of the invention, including the embodiment illustrated by FIG. 3, it may be useful for the kernel of the operating system 310 to populate a shared page 380 between the kernel and user applications, such as user application 312, with similar translation information as that provided in the shared page 370. Based on translation information obtained from the shared page 380, user applications, such as user application 312, may then perform a translation on the value of the TSC, thus accounting for a changed TSC frequency due to the migration of a guest partition.

While in the embodiment of FIG. 2, a single shared page 380 is illustrated as being shared between the kernel of the operating system 310 and all user applications, in other embodiments of the invention, the kernel of operating system 310 may share separate pages between itself and each user application, such as user application 312. The shared page 380 may in some embodiments be the same page 370 that is shared between the operating system 310 and the hypervisor 306, while in other embodiments it may have different content.

For example, in some embodiments, the shared page 380 may be a page that would have already been shared with all user applications, and that includes information other than translation information relating to TSCs. In these embodiments, the shared page 380 may include a flag indicating whether or not the TSC support is available in a virtualized environment. Thus, a user application may make the determination whether to use a TSC for a reference timer implementation based on a value stored in the shared page 380, and may not need to issue a CPUID instruction to a virtual processor.

If the user application determines that TSC support is not available, it may implement a reference timer based on legacy methods, such as a method that requires accessing the ACPI PM timer, as discussed above. If using a legacy method, such as one that requires access to the ACPI PM timer, the user application, such as user application 312, may require issuing a system call to the kernel for each access of the ACPI PM timer.

While the example of FIG. 3 applies the invention to a virtualized environment, in which the user application executes on top of an operating system that executes on top of a hypervisor, it is to be appreciated that the invention could also apply to a native environment, in which the operating system is executing directly on native hardware, without a hypervisor. For example, operating system 310 may be executing directly on physical hardware 304. A user application, such as user application 312, executing on top of the operating system 310 may have the privileges to access a time stamp counter, such as TSC 340, directly from a physical processor, such as the physical processor 320, without the need to issue a system call to a kernel of the operating system 310. However, the user application 312 may still need to apply a translation, such as an offset, to the value obtained from the TSC 340, but the user application 312 may not have access to the appropriate translation on its own. Therefore, without the invention providing the appropriate translation information, the user application 312 may still be required to access the TSC 340 through a system call, even in a native environment. However, if the invention is applied to the native environment, the user application may obtain translation information generated by the kernel of the operating system 312 through a shared page, shared, and may therefore be able to access and use values obtained from TSC 340 without the need to issue a system call to the kernel of the operating system 312.

Figure 4:
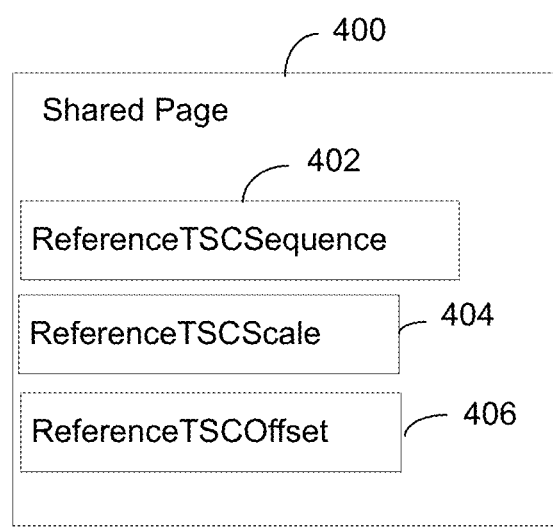
FIG. 4 is block diagram of a shared page for supporting the translation of a TSC, according to some embodiments of the invention.

FIG. 4 illustrates a shared page 400 for supporting the translation of a TSC, according to some embodiments of the invention. Shared page 400 may be either or both of a page, such as page 380 in FIG. 3, shared between user applications and the kernel, and a page, such as page 370 in FIG. 3, shared between a guest partition and a hypervisor. In the exemplary embodiments of FIG. 4, the shared page 400 includes three fields, a ReferenceTSCSequence field 402, a ReferenceTSCScale field 404, and a ReferenceTSCOffset field 406. However, other embodiments of the invention may include a greater or lesser number of fields in a shared page to support the translation.

The ReferenceTSCSequence 402 field may be used to indicate whether a migration has occurred. In some embodiments of the invention, when a guest partition is restored by a virtual machine on different hardware from that on which it was saved, or during live migration, the hypervisor may increment the ReferenceTSCSequence 402 field. In some embodiments, the ReferenceTSCSequence 402 field is also set to a special, "invalid" value by the hypervisor if the destination platform does not support the TSC feature.

When a hypervisor saves the state of a guest partition, or when it initiates a live migration, the hypervisor may also save a value that corresponds to the ReferenceTSCSequence 402 as part of the data that may need to be copied when saving or migrating a guest partition. When the guest partition is restored, or when the migrated guest partition is brought online on the destination computer, the hypervisor may store the value in the ReferenceTSCSequence 402 field of the shared page. Software in the guest partition may then read and compare the value of the current sequence number to the saved sequence number to determine if the guest partition has been migrated to a different machine.

The ReferenceTSCScale 404 and ReferenceTSCOffset 406 may be used in some embodiments of the invention, as a scale factor and offset, respectively, to perform the translation between a first TSC frequency of a processor on a source machine and a second TSC frequency of a processor on a destination computer. In some computer systems, a hypervisor may normalize the TSC frequency to a standardized frequency, such as 10 MHz, that would be used by all supported hypervisors across all physical computers. In these embodiments, the ReferenceTSCScale 404 and ReferenceTSCOffset 406 may be the values needed to translate from a TSC frequency to the normalized frequency. However, other embodiments may not use a normalized frequency across all hypervisors, but may instead employ any other suitable method, such as maintaining the TSC frequency from the first computer as the effective translated frequency after any migrations to other computers.

Figure 5:
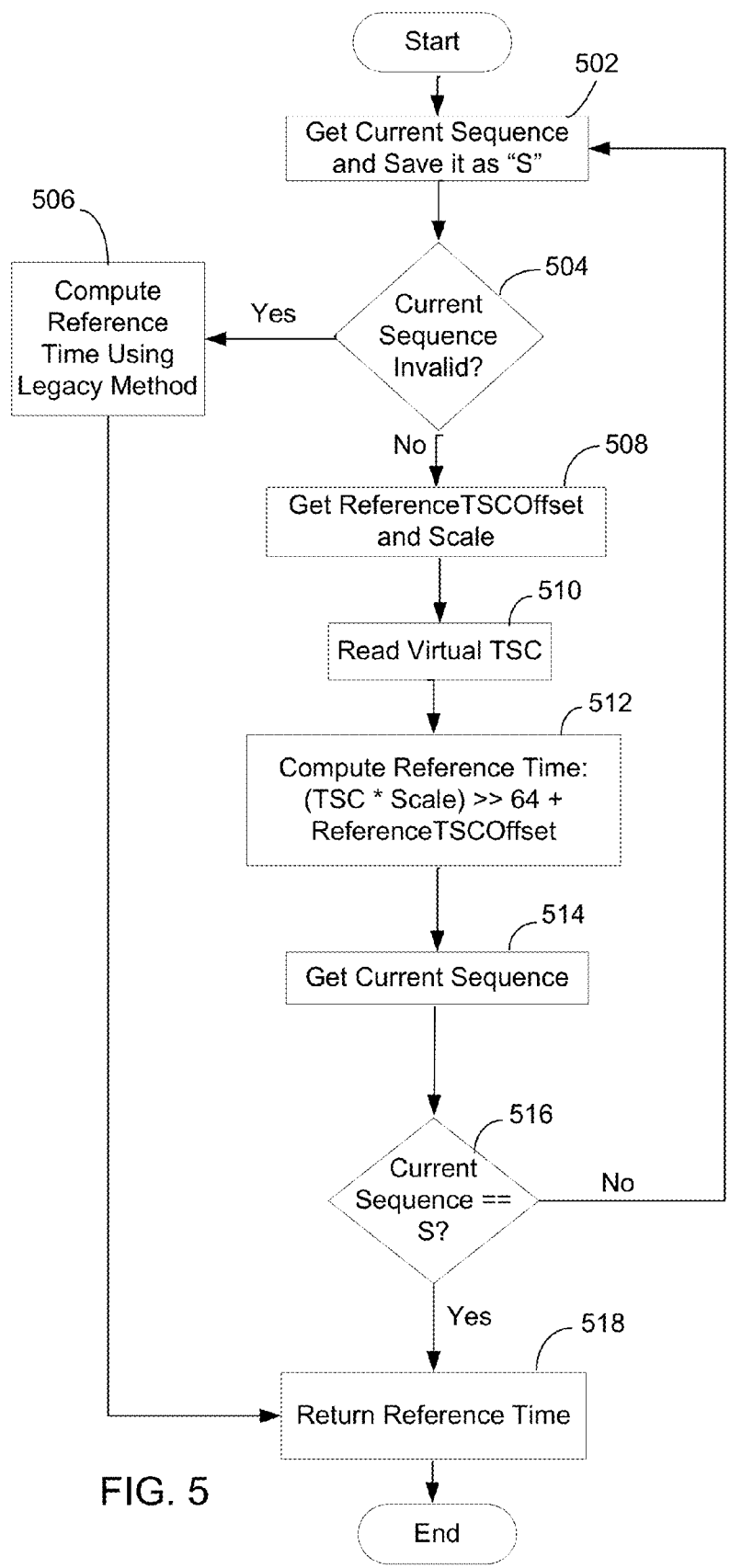
FIG. 5 is a flowchart of a method of calculating a translated reference time based on a TSC, according to some embodiments of the invention.

FIG. 5 is a flowchart of a method of calculating a translated reference time based on a TSC, according to some embodiments of the invention. It may be implemented as machine executable instructions in software in any suitable programming language, in either user-mode or kernel-mode. The discussion below assumes that the method is performed by an operating system; however, it should be understood that a similar, or even identical, process may be performed in a user-level application, such as was discussed in conjunction with FIG. 3. In addition, the discussion assumes that the interface between the operating system and the hypervisor is a shared page according to the embodiment of FIG. 4; however, it should be appreciated that any suitable interface may be used.

At block 510, the operating system obtains the current sequence number, such as the ReferenceTSCSequence 402 in the embodiment of FIG. 4. It may also, at least temporarily, store the sequence number, such as in a variable named 'S.' At block 504, the operating system may then check whether the current sequence number is set to a special "invalid" value indicating that the platform does not support accessing a virtual TSC.

If the operating system determines that the sequence number is set to the "invalid" value, the process proceeds to block 506, in which the operating system computes the reference time using a legacy method. Any suitable legacy method may be used, such as by accessing the ACPI PM timer. The method then proceeds to block 518, in which it returns the calculated reference time. The process may terminate, as it may be finished at this point.

Otherwise, if the operating system determines at block 504 that the current sequence number is not set to the special "invalid" value, it may then proceed to block 508 in which it may obtain the ReferenceTSCOffset and Scale, which may be the ReferenceTSCOffset 404 and ReferenceTSCScale 402 illustrated in conjunction with FIG. 4, obtained from a page shared between the operating system and the hypervisor, such as shared page 370 of FIG. 3. The method may then proceed to block 510, in which the operating system may read the value of the virtual TSC. In some environments in which the invention is practiced, this may be done without causing any intercept into the hypervisor.

At block 512, the operating system may then compute the reference time. It may do so in any suitable way. In the embodiment illustrated by FIG. 5, the operating system may compute the reference time by first performing a multiplication of the obtained TSC value and the scale factor. In some embodiments of the invention, the TSC value and the scale factor are 64 bit values, and the multiplication is a 128-bit multiplication. The product may then be shifted to the left by 64 bits so that only the upper 64 bits are used. The result of the product and the bit-shift may then be added to the ReferenceTSCOffset. The resulting sum may then be the translated reference time in the appropriate frequency, which in some embodiments of the invention, may be a normalized frequency.

At block 514, the operating system then obtains the current sequence number again, based on the value in the shared page. At block 516, it compares the sequence number it just obtained with the saved sequence number, 'S.'

If the sequence numbers do not match, this indicates that the guest partition has been migrated to another computer in the middle of the process of FIG. 5, and the process may return to block 502, in which the operating system will retry computing a reference time. Otherwise, if the sequence numbers do match, the operating system may then proceed to block 518, in which it may return the translated reference time, and the method of FIG. 5 may be finished at this point.

Figure 6:
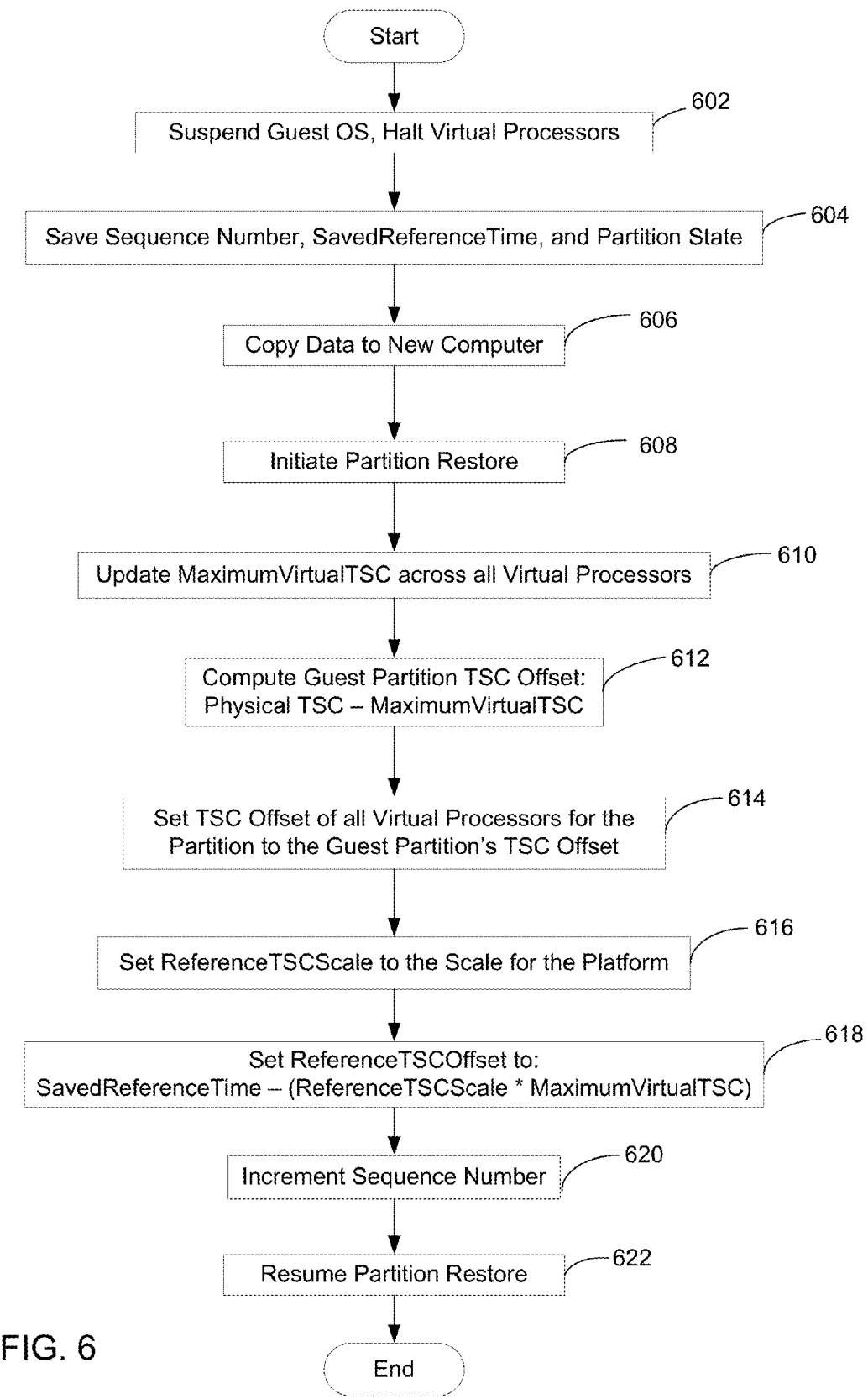
FIG. 6 is a flowchart of a method, according to some embodiments of the invention, for generating the translation information by a hypervisor, to support the translation of the TSC by software executing in a guest partition.

FIG. 6 is a flow chart of a method, according to some embodiments of the invention, for saving and restoring a guest partition, including generating the translation information by a hypervisor to support the translation of the TSC by software executing in a guest partition. Thus, the method of FIG. 6 may be used to populate the content of a shared page between the hypervisor and a guest partition, such as shared page 370 in FIG. 3. While the shared page may be in any suitable format, the method of FIG. 6 assumes that the shared page is in the format of the embodiment of shared page 400 in FIG. 4.

The method may be invoked by computer-executable instructions in a hypervisor developed in any suitable programming language on two machines. The first part of the method may be invoked in a hypervisor on a first machine when the hypervisor is saving the state of a guest partition or at the start of a live migration of the guest partition. The second part of the method may be invoked in a hypervisor on a second machine when the hypervisor is restoring a guest partition on the second machine or during a live migration of the partition to the second machine.

The method may begin at block 602, in which the guest operating system in the guest partition may be suspended, which may be initiated by the hypervisor on the first machine. The hypervisor on the first machine may also halt the virtual processors of the guest partition.

Proceeding to block 604, the hypervisor may then save the state of the guest partition. This may include saving the state of emulated hardware on the guest partition, as well as any other suitable state information, which may include, in some embodiments of the invention, saving a sequence number and a SavedReferenceTime, corresponding to the last value of a virtual TSC in the guest partition before it was suspended.

At block 606, the saved guest partition data may be copied to the second machine. This may be done in any suitable way, including physically transporting the data in a computer storage medium such as a tape to the second machine, or transmitting the data over a computer network. This step may be performed by any entity, including the hypervisor on the first machine, the hypervisor on the second machine, or any other suitable human being or software or hardware entity.

The method may then proceed to block 608, in which the hypervisor in the second machine may initiate the process of restoring the guest partition. In some computer systems, the TSC on a physical processor may be re-initialized to zero when a computer is powered on or reset, but otherwise, the TSC value may be increasing, according to its frequency. Thus, a virtual TSC in a guest partition may also be increasing in value, unless the guest partition is powered off or reset. In the case in which a guest partition is saved and restored, the TSC value may resume on restore the last value it had at the time the guest partition was saved.

In some environments in which the invention is practiced, a virtual TSC corresponds to a physical TSC that has had an offset applied to it, so that the physical TSC with the offset applied has the initial value that a guest partition would expect upon a restore. In some environments, a physical processor provides hardware virtualization assist that allows a hypervisor to specify to a processor what the appropriate offset should be for each guest partition executing on the physical computer. Thus, a virtual processor may correspond to a physical processor with the appropriate TSC offset applied.

This TSC offset for application by a physical processor, however, may not be the same offset as the ReferenceTSCOffset discussed in conjunction with FIGS. 4 and 5. While the TSC offset may be useful to set the appropriate initial value for the virtual TSC, it may not account for the change in TSC frequency that may result from a migration of a guest partition to a different physical computer, with processors having different TSC frequencies. Thus, both offsets may be needed by the hypervisor.

At block 610, the hypervisor on the second machine may obtain and update the maximum virtual TSC across all virtual processors. It may do this in any suitable way, including based on information about the TSC for the virtual processors that was stored when the guest partition was saved.

At block 612, the hypervisor on the second machine may compute the guest partition TSC offset. The computation may involve subtracting the maximum virtual TSC in step 610 from the physical TSC of a physical processor. The method may then proceed to block 614, in which the hypervisor on the second machine may set the TSC offset of all virtual processors for the partition being restored or migrated to the value of the guest partition TSC offset.

The hypervisor may then, at block 616, set the value of the ReferenceTSCScale field in the shared page to the scale factor for the second machine. For example, in embodiments in which the hypervisor computes a normalized TSC value, the scale factor may correspond to the scale factor that is needed to translate the frequency of the physical TSC to the normalized frequency value.

The process may then proceed to block 618, at which the hypervisor on the second machine may compute the value of the ReferenceTSCOffset, and store the value in the shared page. This may be done in any suitable way. In the embodiment of FIG. 6, the value is computed by multiplying the value of the ReferenceTSCScale obtained in step 616 with the maximum virtual TSC obtained in block 610. The hypervisor on the second machine may then subtract the resulting product from the SavedReferenceTime, which may have been saved by the hypervisor on the first machine in the step at block 602.

At block 620, the hypervisor may then proceed to increment the sequence number saved by the hypervisor on the first machine, to indicate that a migration has occurred. The sequence number may correspond to the value of the ReferenceTSCSequence field 402 of FIG. 4.

At block 622, the hypervisor on the second machine may then resume the process of restoring the guest partition, which may be done in any suitable way, including bringing the virtual processors for the guest partition online. The method of FIG. 6 may be finished, at this point.

The lines below are exemplary software instructions for calculating a reference time in a guest partition according to a virtual TSC.

```
Repeat:
    Sequence = Stats->ReferenceTscSequence;
    If (Sequence ==
    HV_REFERENCE_TSC_SEQUENCE_INVALID)
    {
        // The reference time enlightenment is not currently // available.
        goto Fallback;
    }
    Tsc = RDTSC( );
    Scale = Stats->ReferenceTscScale;
    Offset = Stats->ReferenceTscOffset;
    ReferenceTime = (Tsc * Scale) >> 64 + Offset;
    If (Stats->ReferenceTscSequence == Sequence)
    {
        return ReferenceTime;
    }
    goto Repeat;
Fallback:
    // Fall back to a different method to get reference time
```

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device comprising a processor and storage coupled with the processor, the method comprising:

executing a hypervisor that manages execution of virtual machines on the computing device, the virtual machines including a virtual machine comprising an operating system and a user-mode application running within the operating system, the virtual machine further comprising a virtual processor comprising a virtual timestamp counter (TSC);

providing a shared memory that is shared by both the hypervisor and guest software executing within the virtual machine, the shared memory comprising a TSC memory location to store TSC information, the TSC memory location comprising a memory location of a portion of a physical memory device, wherein the TSC memory location is used as an interface for inter-process communication between the hypervisor and the guest software executing within the virtual machine, wherein both the hypervisor and guest software of the virtual machine directly access the TSC memory location of the portion of the physical memory device to directly exchange the TSC information, wherein the guest software of the virtual machine directly reads from the TSC memory location without causing a corresponding intercept into the hypervisor to access the TSC memory location; and directly writing, by the hypervisor, time translation information to the TSC memory location, wherein the time translation information is computed by the hypervisor, and directly reading, by the guest software, without causing a corresponding intercept into the hypervisor, the TSC memory location to obtain therefrom the time translation information, the guest software comprising a guest operating system executing in the virtual machine or an application executed by the guest operating system.

2. A method according to claim 1, further comprising restoring the virtual machine from a suspended state by the hypervisor, and as part of the restoring: evaluating timer information in the TSC location that was stored in the TSC location when the virtual machine was suspended, and based on the evaluating computing time translation information.

3. A method according to claim 2, wherein the evaluating is performed using the timer information and a time value from a physical TSC of the processor.

4. A method according to claim 2, further comprising setting a TSC offset of a virtual TSC managed by the hypervisor and used by the virtual machine, the virtual TSC comprising an element of a virtual processor of the virtual machine.

5. A method according to claim 1, wherein the time translation information comprises scale information obtained according to a frequency of a physical TSC of the processor.

6. A method according to claim 5, wherein the virtual processor comprises a virtual TSC, the method further comprising:
  reading, by the operating system or the user-mode application, the scale information from the TSC location;
  obtaining a time value from the virtual TSC; and
  computing a reference time according to the scale information and the time value.

7. One or more computer-readable storage devices, the one or more storage devices storing information to enable a computing device, comprising a processor and storage, to perform a process, the process comprising:
  executing a hypervisor that manages execution of a virtual machine on the computer, the virtual machine hosting guest software comprising a guest operating system and an application executable by the guest operating system;
  providing a shared memory location that is a location of physical memory shared by both the hypervisor and the guest software of the virtual machine, the shared memory location functioning as an interface between the hypervisor and the guest software by enabling the hypervisor to directly write to the shared memory location and the guest software to directly read from the shared memory location, the shared memory location storing time information about a time stamp counter (TSC) on a physical computer that previously hosted the virtual machine, wherein the guest software is able to read the shared memory location without a corresponding intercept by the hypervisor; and
  reading, by the guest software reading, the shared memory location to obtain the time information from the shared memory location, and computing the reference time using the time information read from the shared memory location, wherein the guest software does not obtain the time information through the hypervisor.

8. One or more computer-readable storage devices according to claim 7, wherein the shared memory is used by the hypervisor to determine whether the virtual machine has been migrated.

9. One or more computer-readable storage media according to claim 7, wherein the shared memory is used by the operating system or the user-mode application to determine whether to compute a reference time by either issuing a call that will result in an interrupt to the hypervisor or by obtaining a time value from a virtual TSC.

10. One or more computer-readable storage media according to claim 7, wherein the application or the operating system has a reference time computing process to compute a reference time, wherein the reference time computing process determines whether to attempt to access a virtual TSC based the shared memory.

11. One or more computer-readable storage media according to claim 10, wherein the reference time computing process updates the shared memory after the virtual machine has been restored.

12. One or more computer-readable storage media according to claim 7, wherein the virtual machine originated from another computing device and the hypervisor updates the shared memory when restoring the virtual machine.

13. One or more computer-readable storage devices according to claim 7, the process further comprising determining whether the computing device comprises a physical TSC and storing an indication of the determination in the shared memory.

14. One or more computer-readable storage devices according to claim 13, wherein the indication comprises a flag that controls whether the application or operating system will attempt to use a virtual TSC.

15. A computer comprising storage coupled with a processor, the storage including physical memory, the computer further comprising:
  a hypervisor stored on the storage and executed by the processor, the hypervisor managing a virtual machine, the virtual machine comprising a virtual processor implemented by the hypervisor, the virtual processor comprising a virtual TSC, the virtual machine hosting a guest software component executing in the virtual machine, the guest software component comprising a guest operating system or an application configured to be executed by the guest operating system;
  a shared memory location comprising a location of the physical memory, wherein the shared memory location is directly writable by the hypervisor and is directly readable by the guest software component; and
  the hypervisor, writing TSC information to the shared memory location for availability to the guest software component, the guest software component accessing the TSC information by reading the shared memory location and using the TSC information therefrom to control how the guest software component uses the virtual TSC, wherein the shared memory location is directly read by the guest software component without a corresponding intercept into the hypervisor.

16. A computer according to claim 15, wherein, when resuming the virtual machine from a suspended state, the hypervisor populates the shared memory with the TSC information.

17. A computer according to claim 15, wherein the software component determines whether to attempt to access a virtual TSC.

18. A computer according to claim 15, wherein the shared memory is updated with new TSC information responsive to resuming the virtual machine on another computer.

19. A computer according to claim 15, the computer not comprising a physical TSC, and the hypervisor determines that a physical TSC is not available and updates the shared memory accordingly.

20. A computer according to claim 19, wherein the software component determines to issue a timer call that will interrupt the hypervisor based on the updated shared memory.

21. A method according to claim 1, wherein the time translation information is read from the TSC memory location to the guest software without going through or being provided by the hypervisor.

* * * * *